United States Patent
Cartsensen

(10) Patent No.: US 6,942,254 B2
(45) Date of Patent: Sep. 13, 2005

(54) THREADED CONNECTION ENGAGEMENT AND DISENGAGEMENT SYSTEM AND METHOD

(76) Inventor: Kenneth J. Cartsensen, 1860 Whiteoak Dr., #211, Houston, TX (US) 77009

( * ) Notice: Subject to any disclaimer, the term of this patent is extended or adjusted under 35 U.S.C. 154(b) by 25 days.

(21) Appl. No.: 10/357,220

(22) Filed: Feb. 4, 2003

(65) Prior Publication Data

US 2004/0231127 A1 Nov. 25, 2004

Related U.S. Application Data

(63) Continuation-in-part of application No. 09/961,391, filed on Sep. 25, 2001.
(60) Provisional application No. 60/354,880, filed on Feb. 5, 2002.

(51) Int. Cl.$^7$ .................................................. F16L 7/00
(52) U.S. Cl. ..................... 285/123.1; 285/333; 403/227; 403/41; 403/156; 29/452
(58) Field of Search ....................... 29/700, 428, 426.4, 29/426.1, 446, 452, 236, 240, 889.1; 403/343, 266, 275, 41, 112, 156, 204, 227, 300, 279, 304; 285/333, 343, 123.1; 166/85.1

(56) References Cited

U.S. PATENT DOCUMENTS

| | | | | |
|---|---|---|---|---|
| 2,453,079 A | * | 11/1948 | Rossmann | ................ 74/579 R |
| 2,652,231 A | * | 9/1953 | Smith | ........................... 403/26 |
| 2,690,934 A | * | 10/1954 | Holcombe | ................ 166/241.2 |
| 3,486,557 A | * | 12/1969 | Harrison | ....................... 166/68 |
| 4,205,926 A | * | 6/1980 | Carlson | ....................... 403/266 |
| 4,484,833 A | * | 11/1984 | Gallagher, Jr. | .............. 403/267 |
| 4,968,068 A | * | 11/1990 | Larsson L. Kenneth | .... 285/390 |
| 5,010,635 A | | 4/1991 | Clark | |
| 6,328,499 B1 | * | 12/2001 | Reding et al. | .............. 403/299 |

* cited by examiner

Primary Examiner—David P. Bryant
Assistant Examiner—Stephen Kenny
(74) Attorney, Agent, or Firm—Jones Tullar & Cooper, PC; Raymond A. Bogucki

(57) ABSTRACT

A system for making and breaking connections between the pin ends of sucker rods and coupling sleeves employs a hydraulically powered system of radially driven gripper heads which are interchangeable to accept different sucker rod sizes. A torqueing system adjacent the gripper head system is also hydraulically driven, employing a pivotally coupled free end on a torque wrench which engages the wrench flat on the sucker rod at its opposite end. The coupling is securely retained without marring the coupling surface while the torque necessary to make or break the connection is applied rapidly and controllably. The system can also be used to advantage in preassemble sucker rods into couplings with precise prestress, using an improved connection design. A sucker rod string can then be assembled readily in the field with invariant optimum prestress conditions at each connection.

10 Claims, 6 Drawing Sheets

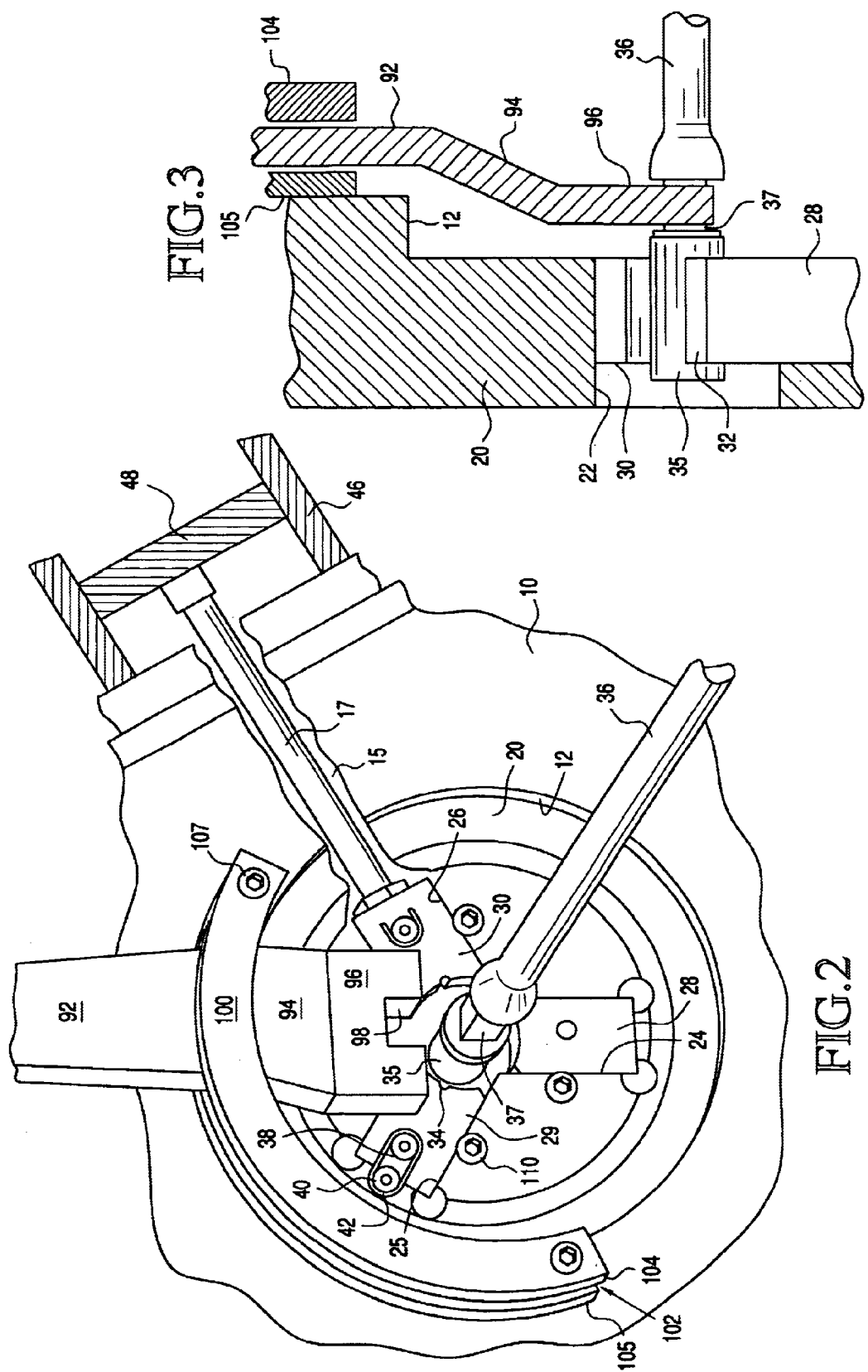

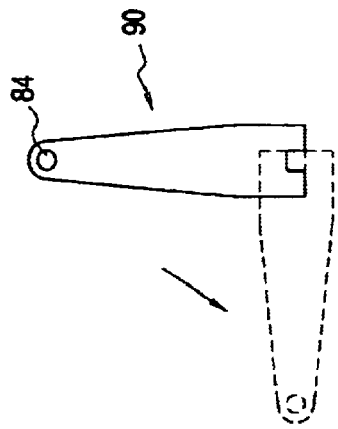
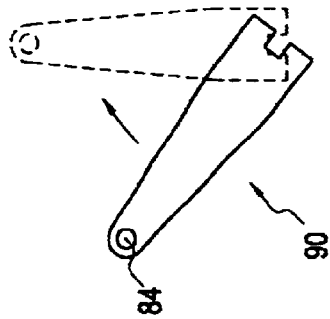
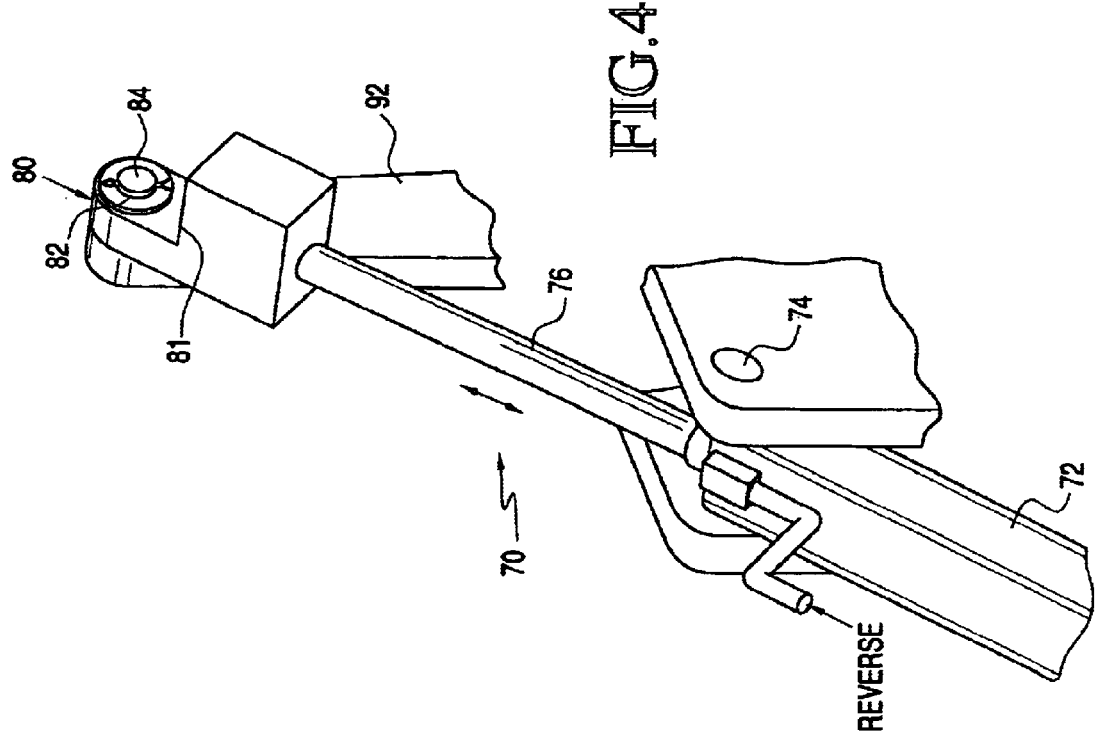

THREADED CONNECTION ENGAGEMENT AND DISENGAGEMENT SYSTEM AND METHOD

REFERENCE TO PRIOR ART

This application relies for priority on provisional application Ser. No. 60/354,880 filed Feb. 5, 2002. This invention also is a continuation-in-part of application Ser. No. 09/961,391 filed Sep. 25, 2001 by Kenneth J. Carstensen and entitled "Connectable Rod System for Driving Downhole Pumps for Field Installations".

FIELD OF THE INVENTION

This invention relates to systems and methods for handling threaded connections between rods and tubular goods, and particularly to making and breaking connections for sucker rods that are employed in petroleum production.

BACKGROUND OF THE INVENTION

When manipulating rods and tubular goods, particularly in the petroleum industry, it is often required to disengage or "break" connections between successive lengths of rod or tubing, and to meet specific operating requirements when doing so. In other circumstances, the same threaded interconnections have to be engaged or "made up" very precisely.

Specific examples of these of needs arise with "sucker rods", which are used in downhole strings in petroleum wells to power a reciprocating or rotary pump from a power source at the surface. Sucker rod connections in use today are predominantly based upon the three part design and standards set in 1926 by the American Petroleum Institute (API). These standards were set so that, under given stress and other conditions the operator could assemble a sucker rod string that would meet the applicable standards and have a long lifetime of usage. With a reciprocating pump installed at a downhole location, for example, properly engaged API couplings and rods assembled into a sucker rod string of many hundreds of rods are calculated to operate through millions of cycles before failure. The sucker rods must withstand the varying forces generated during cycling although of necessity they must be limited in diameter, as in the range of $5/8^{th}$ inch to 1 and ½ inches. The operator, to save costs, uses the smallest diameter tubing that will suffice to provide the cross-sectional area needed for product flow, which is inherently reduced by the size of the interior sucker rod string. In other words, sucker rods cannot be intentionally overdesigned, so that the rod lengths, and the couplings between them, must meet stringent requirements governed mainly by the internal diameter of the production tubing they are to operate in.

The API-type sucker rod configuration has, for each sucker rod, a threaded region at each pin end, together with an adjacent "wrench flat" at which torque is applied to engage and disengage the adjacent threaded portion in the pin end from the coupling, or internally threaded sleeve, in which the rod end is received. A protruding shoulder on the pin end between the threaded terminal section and the wrench flat is so designed as to engage the end of the coupling to prestress regions of both the threaded connection and the coupling to selected levels, on makeup. This prestressing is accomplished by torquing the rod pin end relative to the coupling during makeup by a selected fraction of a turn past the hand tight rod shoulder to coupling end contact point. The coupling receives the opposite ends of two rods in this fashion, and the design is such that the coupling nominally has greater strength and life expectancy than the body of the rod itself. When a sucker rod string is withdrawn upon failure, a need for maintenance, or by reaching its allowable lifetime, the connections must be "broken" (disengaged), in a manner which does not affect the anticipated lifetime of the unit.

There are a number of factors, however, principally fatigue-oriented factors, which affect the useful lifetime of a sucker rod string, and these factors tend to center in the coupling region. Much consideration has been given to analysis of the problems and causes of failure, because of the costliness of failures and the limitation on sucker rod life that such failures impose. These analyses have shown that, with repeated cycling, minor physical imperfections in a coupling or adjacent rod segment tend to become stress riser points, and that the imperfections grow with time, leading to early fracture or other failure of the connection. Relative movement between the rod pin end and the coupling, as can arise with excessive or inadequate prestressing at the threaded and shoulder regions, also introduces relative displacements between parts that tend to grow with time. This is another frequent cause of fatigue life failures.

Clearly, economics dictates that sucker rod strings be useable for as many total cycles and as many make and break operations as feasible. Particular care is paid by operators to the steps of disengagement of sucker rods from couplings, but there are other inherent problems which have not heretofore been satisfactorily overcome. When two sucker rods joined by an intermediate coupling are to be disengaged, each sucker rod can be gripped at its wrench flat by a separate wrench, and torque can be applied to break the connection with one of the rods, dependent upon whichever sucker rod is less firmly engaged. This of course leaves the coupling still engaged to the other sucker rod, and this connection cannot be broken, usually, without applying several thousand foot pounds of torque to the connection. To accomplish this without marring the surface of the coupling, the general industry approach has been to hold the coupling fixed with a smooth-faced friction wrench, and then to attach a wrench with a notched end to the wrench flat area. Torque is then applied manually to the handle, or an extension of the handle, so as to break the connection free solely by muscle power via the extended lever arm. A smooth-faced friction wrench will typically not provide enough manual retention force without slipping, so that sand is often interposed between the coupling and wrench faces to increase frictional restraint, which is not always adequate and also may mark the coupling surface.

As pointed out in Clark U.S. Pat. No. 5,010,635, this manual procedure is time consuming and often dangerous, so Clark proposes a mechanical, power operated friction wrench design. This mechanical and presumably automatic machine has not found widespread use, however, because of various difficulties encountered in practice, because of a lack of versatility in accepting different sucker rod sizes, and because it is not intended for use in precision make up, but only in breaking connections.

The makeup of connections between sucker rod-coupling combinations of the type described in the above-referenced Carstensen application makes possible significant benefits in terms of load bearing capabilities and fatigue life. The displacements between the four components of the connection can be precisely controlled in a maimer which is highly advantageous for meeting operational requirements at the production or production workover rig. Operators heretofore have used a torque measurement method or a circumferential displacement method, or a combination of the two. In the torque measurement method the power tong driver unit is set at a given level or an indicator gives a reading of pressure or torque, while in the displacement method the angle of relative rotation between pin end and coupling is used. To do this the two components are marked with indicia which are to be brought into coincidence when torque is applied. Crews will often start with the circumferential displacement method and observe readings of how much torque is required, and thereafter follow the pressure or torque indicators instead of trying to match the displacement lines precisely, which is much more time consuming.

Extensive studies of pin end to coupling engagement, however, have shown that these prior techniques are subject to substantial variations in final relative positions, depending upon such factors as the relative wear of the thread forming tool, and the number of uses of the coupling or pin. Even though the elements are within tolerances, the actual engagement that results varies to an undesirable extent. In the novel sucker rod connection design disclosed in the Carstensen application, in which a torque washer alternative is used, the dimensions between the pin end shoulder and the end face of the pin end are precisely maintained. Also, the axial length of the coupling itself, and the axial length of the torque washer that is interposed between the end faces of the pin ends are precisely controlled. When these units are properly made up, the pin necks are prestressed to selected tensions, the coextensive portions of the coupling are under compression between the thread regions and the pin end shoulders, and the central torque washer is under compression while the coextensive length of the coupling at the center region is in tension. This arrangement provides a unified structural combination which greatly inhibits micromovements of the elements relative to each other and locks the threads into firm engagement.

SUMMARY OF THE INVENTION

In a system in accordance with the invention, for use in breaking and making connections to sucker rods, the coupling is engaged between smooth conforming surfaces on the ends of at least three radially disposed gripper heads at like angular spacings about a central axis along which the coupling is placed. The gripper heads are mounted to slide in a massive base and are changeable, such that gripper surfaces with different curvatures may be employed to accommodate different sizes of sucker rods. One of the gripper heads is fixed in position, which establishes the coupling center, but each of the other two is hydraulically powered to move toward the coupling by a piston/cylinder combination mounted on the base. The pressure limits are set by an adjustable pressure relief valve in hydraulic lines to the cylinder. The movable gripper heads lie in a plane transverse to the central axis of the coupling, and are radially translatable relative to the central axis. The use of hydraulic power in this manner assures that selectable radial forces are applied to three arcs covering the majority of the circumferential surface of the coupling, restraining it against rotational movement. The concave faces of the gripper arms include central grooves transverse to their curvatures, for collection of particulates that might tend to induce surface defects. A torque wrench having an end notch sized to engage the wrench flat on an adjacent sucker rod pin end, is disposed radially to the central axis of the coupling and sucker rod, and extends to a free end at which torque can be applied. The torque wrench arm is coupled at its free end to a knuckle joint that is engaged by a drive shaft extending from a piston/cylinder combination at the side of the base. The drive shaft draws the free end of the torque wrench in a disengagement direction (or moves it oppositely for engagement) within an arcuate guide path that extends circumferentially about the gripper heads. The torque wrench arm is interchangeable, so different wrench flat sizes can be accommodated corresponding to different sucker rod specifications. The amount of torque applied can again be at a chosen limit, determined by an adjustable pressure relief valve.

This arrangement permits convenient and reliable disengagement of each of a succession of sucker rod-coupling connections by a simple procedure. With the gripper arms for the coupling retracted, the coupling at the end of a sucker rod is simply placed in position against a fixed reference gripper head at the lowermost position and the other two gripper heads are closed in against it with selected forces determined by the hydraulic pressure limit. The torque wrench is moved into position on the wrench flat by pivoting the hydraulic unit slightly, and the wrench drive arm is drawn through a selected angle, which need not be greater than 30° in most instances, but which can be taken through a 90° angle to assure that the coupling can thereafter be manually removed.

The same mechanism is useful for precision make up of one sucker rod and a coupling. In the new sucker rod coupling systems of the Carstensen application, relationships are utilized in which the first sucker rod that is inserted is threaded in to a selected displacement beyond hand tight contact between the shoulder and coupling end. In that position it serves as a reference for the opposing end of the second sucker rod either through an intervening torque washer or directly. When both are engaged properly, they have like prestresses that substantially improve operating life. To this end, the coupling is placed at the gripping position as previously described, with the attached sucker rod, which has been threaded to tightness at the hand tight position, extending outwardly. The wrench arm is started from a position such as to permit the clockwise direction of rotation that is needed for tightening. The sucker rod is driven through a selected arc, such as one quarter turn, to effect the desired positional engagement and prestressing. Alternatively, applied torque can be determined by setting the hydraulic pressure limit of the actuator.

In accordance with other features of the invention, the make/break machine incorporates a measurement system for precise engagement of pin ends into couplings, for delivery production workover rigs or other production sites. A support bracket is mounted on the rear of the support body adjacent an installed coupling that is to be made up into a connection. A dial-type indicator incorporating a probe sensor is mounted along the central axis of the coupling, with the probe extending into the coupling. The sucker rod is then threaded into the coupling to the hand-tight plane, denoting engagement of the pin end shoulder against the coupling end. The axial displacement of the end face of the inserted pin end is then measured as the engagement proceeds from the hand tight plane, until a specific axial displacement from the starting point is reached. With this relationship, the pin neck is under a preselected prestress tension from the elastic stretch as the end face of the pin end is precisely positioned within the coupling. A torque washer of chosen length with flat end faces is then is threaded into the coupling from its open end, into firm engagement against the end face of the inserted pin end. This sequence is repeated at the mill facility for the desired amount of sucker rod inventor to be used at one or more production workover rigs. At the production site, the sucker rod connection is completed by first threading in the second sucker rod to the hand-tight plane and then torquing the second sucker rod until its end face engages the opposing surface of the torque washer, which places the pin neck under the same prestress tension as that of the first sucker rod. Thereafter the torque washer itself as well as the coextensive span of the coupling center, are prestressed by further driving of the second sucker rod into the coupling to insure full thread locking and the unification of the elements in the structure.

BRIEF DESCRIPTION OF THE DRAWINGS

A better understanding of the invention may be had by reference to the following description, taken in conjunction with the accompanying drawings, in which:

FIG. 2 is a perspective view of the mechanism employed in the system of FIG. 1 for retention and relative rotation of the coupling and sucker rod retention, showing further details thereof;

FIG. 3 is a side sectional and fragmentary view of the gripper head mechanism and torque wrench mechanisms used in FIGS. 1 and 2;

FIG. 4 is a perspective view, in fragmentary form, of the torque wrench system utilized in the arrangement of FIGS. 1–3;

FIG. 5 is a schematic simplified view of the changes in position of the torque wrench system during a disengagement operation, and FIG. 6 is a schematic simplified view showing changes in position of the torque wrench system during an engagement operation.

DETAILED DESCRIPTION OF THE INVENTION

Figure 1:
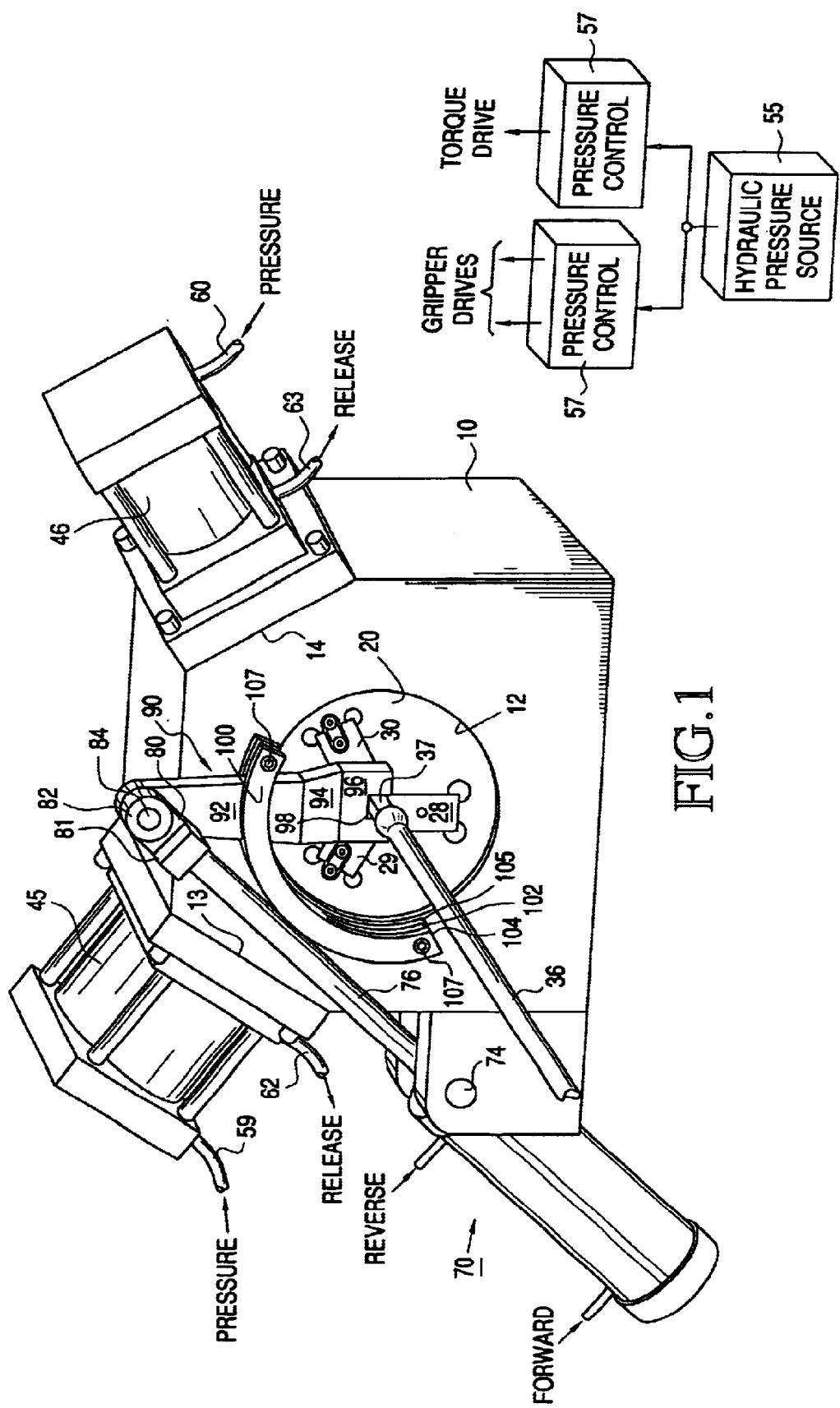
FIG. 1 is a perspective view, partially broken away, of a system for controlling engagement and/or disengagement of rod couplings.

A system in accordance with the invention, referring now to FIGS. 1–4, is structured on a massive and integral base block 10, typically of steel, and therefore adequate to withstand the high forces that are generated in operation. The base block 10 includes, in one wall, a central recess 12 which is concentric with the central axis of the coupling and sucker rod combination that is to be engaged or disengaged. The two top corners 13, 14 of the generally rectangular base block 10 are oppositely angled and include interior bores 15 (FIG. 2) within which drive elements 17 are radially positioned relative to the central axis. Within the central recess 12, a reference plate 20 for gripper elements is mounted transverse to the central axis and itself includes a central bore 22 along the central axis and concentric therewith. The reference plate 20 is of sufficient thickness to withstand high stresses and the central bore 22 is of adequate diameter to receive any sucker rod coupling element that may have to be manipulated. The reference plate 20 also includes generally radial guideway slots 24, 25, 26 of chosen widths, extending radially at equal circumferential spacings into the central bore region along center lines that intersect at the central axis.

The guideway slots 24–26 each receive a gripping head 28, 29 and 30, slidable radially toward or away from the central axis. The bottom gripping head 28, as seen in FIGS. 1–3, is fixed in place radially against an outer limit stop in the reference plate 20. The other two gripping heads 29, 30, however, are moveable in their respective guideway slots 25, 26.

Each gripping head 28–30 is of the same general configuration, with a concave end face 32 having a radius of curvature mating with that of a coupling to be engaged. Each end face 32 also includes a central groove 34 that is parallel to the central axis, and provides a small recess that can accumulate particulates and can be periodically cleaned with a small brush. Because the great majority of sucker rods 36 to be processed are in the $7/8^{th}$ inch to 1½ inch diameter range, the couplings 35 have 1 to 2 inch outer diameters, so that the arc of the curved end faces 32 is typically of the order of 1 inch each, and the central lateral groove 34 is of ¼ to $3/8^{th}$ inch in width. The outer corners of the gripping heads 28–30 are tapered negatively so that when the gripping heads 28–30 are brought together the contact areas of the curved end faces 32 are maximally engaged without interference. Together, the end faces 32 engage the substantial majority of the circumference of the coupling, and cover enough of the length of the coupling 35 to provide contact over a substantial area. The wrench flats 37 on the sucker rod 36 are square, with side dimensions like those of the round sucker rod body.

Each moveable gripping head 29, 30 includes a post 38 which is spaced apart from a reference post 40 on the reference plate 20, while an elastic loop 42 encircles both posts 38, 40, drawing the associated movable gripping head 29 or 30 toward an outer radial stop surface at the end of the associated guideway slot 25 or 26. Thus, when hydraulic forces are not being applied to the movable gripping head 29 or 30, the gripping head is biased away from the position of a coupling that is to be inserted or removed.

Driving forces for the movable gripping heads 29, 30 are provided by separate hydraulic cylinders 45, 46 each mounted on a different angled top corner 13 or 14 of the base block 10. The hydraulic cylinders 45, 46 are large enough to include six inch diameter drive pistons 48, coupled to the drive elements 17 which extend through the bores 15 in the base block 10 to engage the outer radial edge of the associated movable gripping head 29 or 30 at its outer radius. The piston/cylinder combinations (seen only in FIGS. 1 and 2) are of conventional design but able to apply hydraulic pressures up to 5000 psi, even though only limited axial movement (e.g. less than 1") is needed.

Hydraulic pressure is derived from a source 55, which in one practical example provides 5,000 psi maximum pressure. The hydraulic pressure is variable to a selected level by the use of one or two adjustable pressure valves 57, only one being shown in this example, to supply pressurized hydraulic fluid to the two cylinders 45, 46. Pressure lines 59, 60 to the drive side of the pistons within the cylinders power the engagement motion at the gripping heads 29, 30, while return line 62, 63 reverse the direction of movement, allowing the elastic loops 42 to move the gripping heads 29, 30 outwardly.

A torque driver system 70 for rotating sucker rods by engaging the wrench flats that are adjacent the coupling is also mounted on the base block 10. At one side of the base block 10, a hydraulic drive cylinder 72 is mounted on a pivot mount 74, and includes a torque drive shaft 76 extending tangential to a curve about the central axis along a plane that is spaced apart from the reference plate 20. A head or knuckle block 80 on the free end of the shaft 76 includes an offset portion 81 that is laterally displaced toward the direction of the reference plate 20 and includes a pivot pin bore 82 that is parallel to the central axis. A pivot pin 84 extends through this bore 82. A matching bore in the end portion of a torque wrench 90 permits removal and replacement of the torque wrench 90, since the pivot pin 84 may be removably secured by cotter keys or other conventional elements. The torque wrench 90 includes a torque wrench body 92 which is radial, when the torque wrench 90 is in position, to the central axis of the sucker rod which it is to engage. Since high torque is to be applied, the torque wrench body 92 is of high strength steel and sufficiently stiff to withstand applied forces without deflection or failure. The torque wrench body 92 includes an angled section 94, integral within the body, that translates the body from the plane in which it resides at the pivot pin 84, inwardly toward the plane of the reference plate 20 at the engagement end 96. The engagement end 96, or wrench head portion of the wrench 90, lies in a plane that is transversely perpendicular to the central axis and intersects the wrench flat on a sucker rod placed in the unit. The engagement end 96 of the torque wrench body 92 includes a wrench flat notch 98, which is rectangular in form on three sides and sized to fit the transverse dimensions of the wrench flat on a given sucker rod.

Between the pivot pin 84 and its upper end and the wrench head engagement end 96 at the sucker rod, the torque wrench body 92 passes through a torque wrench guide 100 following a circumferential arc about the central axis and defining a guide slot 102 concentric with the central axis between a pair of curved guide elements 104, 105. The guide elements are secured by bolts 107 to the base block 10 about the outside of the periphery of the central recess 12.

The torque wrenches 90 are interchangeable, so that wrench heads 96 of different sizes can be used, depending upon the sucker rod to be engaged. However, the torque wrenches are of standard length, here about 12 inches center to center, because the radial distance between the central axis and the pivot pin axis is unchanged whatever the size of sucker rod that is to be engaged. The use of a 12" lever arm facilitates calculation of torque in foot pounds. Interchangeability requires only that the wrench head 96 be disengaged from the sucker rod by pivoting the hydraulic drive cylinder 72 so that the wrench head 96 is clear of the sucker rod, then disengaging the pivot pin, freeing and removing the torque wrench 90, and reversing the sequence to install a new torque wrench 90. In order to change the gripping heads 28–30, it is only required to remove side guide bolts 110, as seen in FIG. 2, and to insert new heads.

In operation, the disengagement or breaking of the connection between a coupling 35 and a sucker rod 36 requires the application of high torque of an undetermined level, without marring the surface of the coupling 35. The amount of torque required is dependent upon the forces used in the previous engagement, the adhesives employed, and indeterminate factors arising from long term use, such as corrosion, mechanical distortion or other factors. The most critical parameter is the gripping force applied to the surface of the coupling 35, since the torque wrench can be operated at considerable mechanical advantage with the lever arm that is used. However, it can be shown that even in the least favorable case, that is a one inch "slimhole" coupling, a gripping force of 169,680 pounds is provided at 3000 psi pressure, while a gripping force of 282,800 pounds is provided at 5000 psi hydraulic pressure (this is based on the practical example of gripper heads each having 2.50 in$^2$ contact surface area). There being six such contact arcs, there are 12.0 in$^2$ of total head surface contact area. For six inch hydraulic cylinders, the individual piston areas are 28.28 in$^2$, giving a total piston driving area of 56.56 in$^2$, leading to the calculations of 169,680 pounds and 282,800 pounds given above. For the one inch "slimhole" sucker rod, in which the coupling has an OD of 2.0", the total 12 in$^2$ head surface contact gives a head to coupling surface gripping pressure of 14,140 psi at 3000 psi hydraulic pressure, and 23,567 psi, at 5000 psi working pressure. Consequently, the prime requirement, that the coupling be held securely, can readily be met.

When a connection is to be broken, the coupling 35 is inserted against the reference gripping head 28 so as to be at machine center, concentric with a longitudinal central axis, and the hydraulic system is activated so that the drive shafts 50 engage the movable gripping heads 29, 30 securely against the coupling 35, which in turn assures equal force distribution around the perimeter of the coupling 35. The appropriate torque wrench 90 for that size of coupling is then engaged into position, within the guide 100 and with the wrench flat notch 98 engaged to the wrench flat 37. Then the torque driver system 70 is engaged, with the torque drive shaft 76 being drawn into the drive cylinder 72, rotating the pivot pin 84 counterclockwise (FIG. 5) and turning the engaged end of the torque wrench 90 in the same direction, thus breaking the initial resistance and allowing the coupling 35 to be removed manually or with little force from the sucker rod 36.

Another like unit from the same string can then be placed in position against the reference gripping head 28, the movable gripping heads 29, 30 can be moved into contact under load, the torque wrench 90 engaged, and the wrench 90 can be turned to break the connection. Since approximately 90° of arc is available at the torque driving system 70, and since separation of the wrench head 96 from the wrench flat 37 is easily effected because of the pivotally mounted drive cylinder 72, the insertion, positioning, gripping and disengagement are effected surely and rapidly.

Unlike prior art systems, this unit requires no sand between the gripping heads and the coupling surface in order to provide sufficient frictional contact. Furthermore, the majority of the gripping force is distributed about the coupling 35 surface throughout the contact surface areas. Consequently, the coupling 35 is not forced out of round either because of the capture of excessive sand between the faces and the coupling surface or because of misalignment of either of the engaging structures relative to the planes of intersection with the interconnecting parts. Also, the ability to vary the hydraulic pressure by a simple adjustment facilitates use of the system with a wide range of sucker rod and coupling sizes.

A very useful feature is the employment of the transverse grooves 34 in the concave end faces 32 of the gripping heads 28–30, because these grooves 34 trap foreign matter which would otherwise become implanted between the engaging surfaces. Thus, the operator can observe accumulation of foreign matter in the grooves, and simply clean these grooves out every few operations, as needed, using a small wire brush. Given the forces that are needed to grip the coupling, it is apparent that unequal application of force or the introduction of foreign substances, whether sand or dirt or other residue, between the gripping faces and the coupling surfaces, causes an out of round condition, accounting for high reject rates (40–50%) in couplings which are disengaged by prior art systems.

A separate but important related use is the making of interconnections, i.e., the engagement of a sucker rod 36 pin end under controlled conditions to a coupling 35. API and sucker rod manufacturers use circumferential displacement as specifications for proper makeup. If proper circumferential displacement can be accomplished reliably, for API and other standard sucker rod connections before delivery to a production rig, significant benefits accrue. Not only is time for make up of a first side of the connection eliminated at the production site, but proper make up after the hand type position assures that the desired prestressing conditions are achieved with a higher level of reliability and accuracy. This is important not only in terms of the prestress conditions needed for conventional API sucker rod connections in which the shoulder is to be compressed against the coupling end to a desired degree, but also for the new and improved sucker rod connection in which the depth of penetration is controlled so as to provide an interaction between opposed ends of inserted sucker rods, either directly or against an interior torque button. With the latter approach, the precise preinsertion of the first sucker rod 36 end provides an end face position reference on the pin end which simplifies and facilitates insertion of the opposite sucker rod in the field. The second sucker rod need only be torqued to a given level or depth in the field, which assures that, in accordance with the new concept, the pin ends of the sucker rods are in desired compressive relationship while a central region of the coupling is itself in tension.

Accordingly, for engagement or make operations, referring also to FIG. 6, a coupling 35 is placed in the central bore 22 of the reference plate 20 on the concave end face 32 of the reference gripping head 28, with the sucker rod 36, previously engaged into the coupling 35 to the hand tight position, extending outwardly so that it can be engaged by the torque wrench 90 at the wrench flat 37. The drive shaft 96 from the drive cylinder 92 is started from an only partially extended position, and is driven in clockwise direction after the coupling 35 is securely held by the gripping heads 28–30. Full engagement to a desired prestress load is usually achieved within one quarter of a revolution, with both the API and the new improved configuration.

This approach provides both convenience and economic advantages for the operator, and enables the desired configuration and prestress characteristics to be achieved automatically, so that all the interconnections in the sucker rod string are uniform and resistance against fatigue life failure is optimized.

Figure 7:
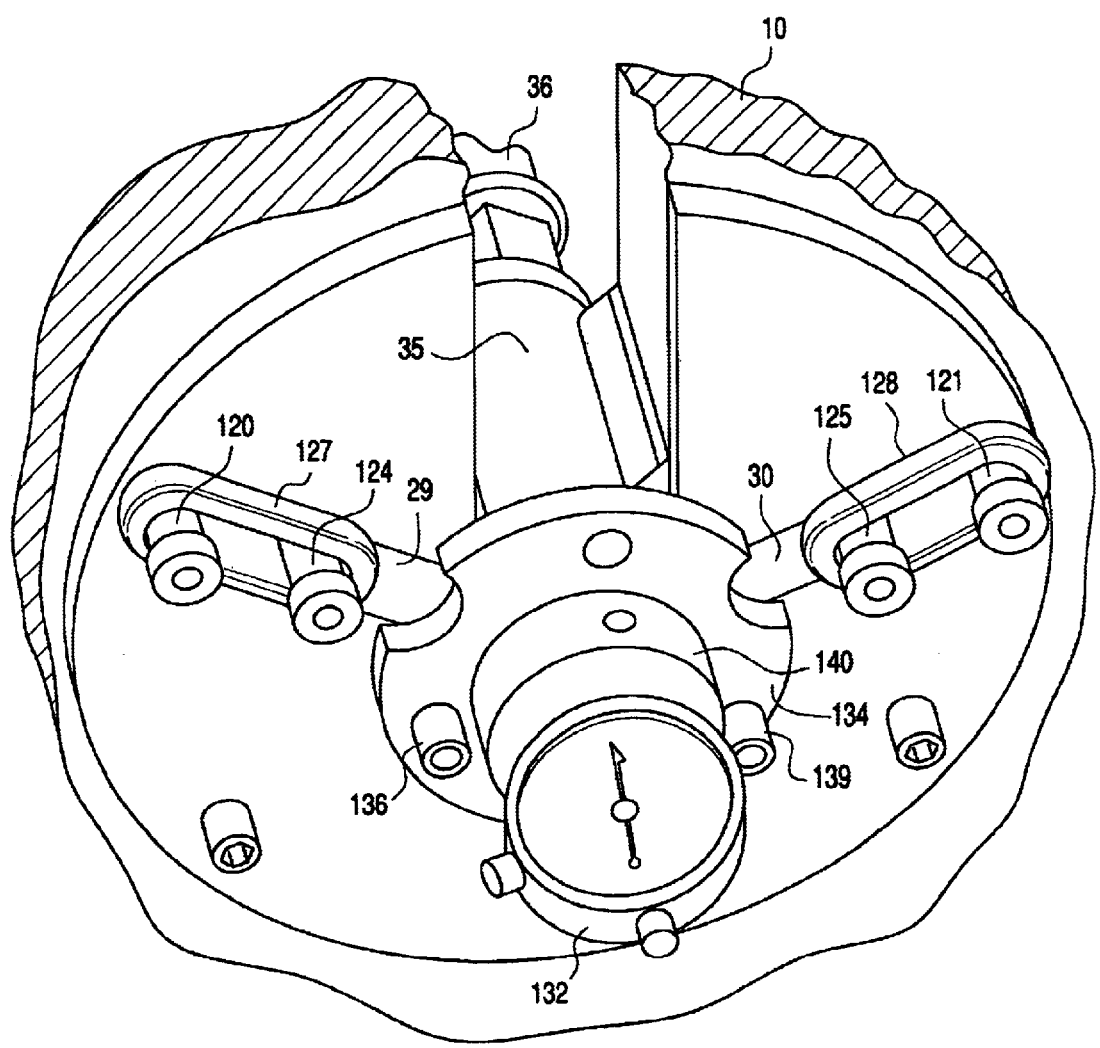
FIG. 7 is a perspective view of a displacement measurement system for use in making up a sucker rod connection.
Figure 8:
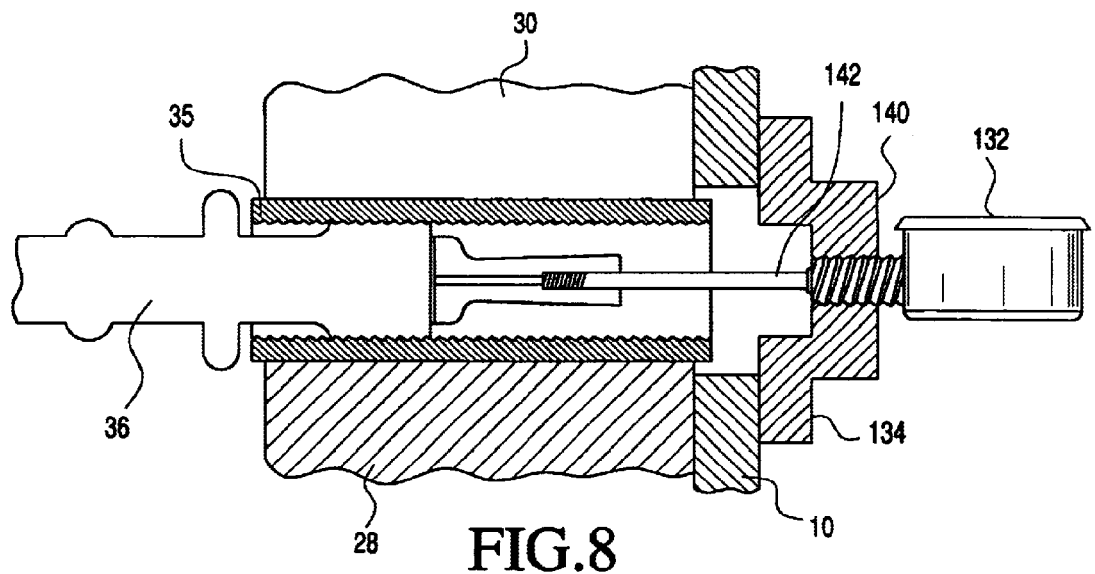
FIG. 8 is a side-sectional view of the installation of FIG. 8, showing only the added elements employed in displacement measurement.

As seen in FIGS. 7 and 8, the reverse side of the massive base block 10 is employed for positional measurement when a sucker rod connection is to be made up at the mill or other facility. The coupling 35, with its open end facing out from the reverse side, is at the loading position in the central recess 12 of the base block 10, ready to receive a sucker rod 36 to be engaged from the front side. The reverse side includes, in alignment with the moveable gripper heads 29, 30, rear side fixed posts 120, 121 which facilitate withdrawal of the gripper heads 29–30 when drive pressure is not applied. When not driven inwardly movable posts 124, 125 that are attached to the gripper heads withdraw them toward the fixed posts 120, 121 because of the compliant loops 127, 128, as previously described in relation to the front portion of the system. A support bracket for a probe-type dial indicator 132, such as the type made by Starratt, which has a pivotable indicator needle on a circumferential face, comprises a flanged member 134 having apertures for mounting screws 136, 139 which fit into the block 10 at a radial spacing from the central axis. The dial indicator 132 is mounted on a hub 140 concentric with the flange 134 and concentric with the central axis. A probe 142 from the dial indicator 132 (FIG. 8) extends into the interior of the coupling to the vicinity of a pin end face. At its terminus, the probe 142, which has a 1" stroke, has a radial end foot 143 in a plane transverse to the central axis. The end foot 143 on the small tip of the probe 142 reduces the danger of damages to the tip 142 by inadvertent contact. At the depth of insertion of the sucker rod 36 pin end that is shown in FIG. 8, the pin end should has not yet contacted the coupling 35 end, and the pin end face short of the foot 143 on the probe 142. Contact with the probe 142 is made as the pin end is threaded in, and the dial indicator 132 provides displacement readings accurate to 0.0001" on the dial indicator.

After insertion of the sucker rod 36 into the coupling 35, and threaded engagement to the hand-tight plane, the apparatus is actuated in the make-up mode, after the dial indicator 132 is initially set at zero or its initial reading is recorded. Thereafter, as the pin end face advances into the coupling, its relative displacement is precisely measured, determining the pin neck stretching and thus the prestress tensioning.

While the connection is in place or thereafter, a torque washer 144 with flat end faces is threaded in from the open end of the coupling 35 to engage firmly and tightly against the end face of the sucker rod 36, in position to transfer axial forces directly against the pin end. The sequence can then be repeated for the remaining number of connections it is desired to make, and the sucker rods are available for inventory or delivery to a production rig site.

At the rig site, when a connection is to be added to the sucker rod string, the coupling at the upper end of the topmost sucker rod is fixed against rotation and the next sucker rod is brought into position and its bare pin end is stabbed in and threadedly engaged to the hand-tight plane. A power tongs for sucker rod engagement, such as one of the commercially available types, is then engaged with the wrench flat of the second sucker rod and it is torqued, with consequent prestressing of the associated pin neck, until the end face of the second pin end engages the torque washer. This event is readily discernable and operatively comparable to engagement stoppage at a hand-tight plane. Because the axial lengths of the elements are precisely determined, the prestress tension in the pin neck of the second sucker rod is the same as in the first. The second sucker rod is then further torqued either by machine or manually, enough to impart some compressive prestress to the torque washer and consequent tension prestress to the coextensive span of the coupling. The final torquing, which can even be done manually using a 5 ft. cheater arm and a pair of crewmen, applies torque in the range of 300–700 ft/lbs directly onto the torque washer for the final lockup. When stabbing in the second pin end, thread lubricant is typically applied.

Figure 9:
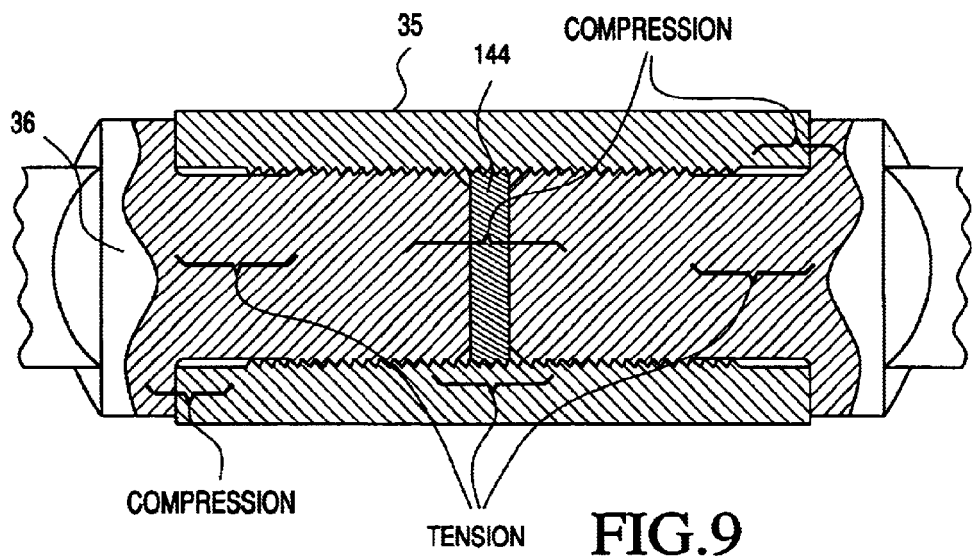
FIG. 9 is a side-sectional view of a sucker rod connection showing areas of prestress in the four-part connection.

Given proper makeup in this manner, the four-part interconnection provides a structurally and operatively superior product in comparison to sucker rod connections in accordance with API specifications. The establishment of prestress conditions in the coupling and pin ends, as seen in FIG. 9, insures uniform thread engagement and locking, while the substantial areas of the end faces greatly reduce local load impact values that occur when the sucker stress has cycled. These load variations include some compressive variations during startup modes, which compressive variations can be very high when gas or oil "pounding" occurs, as when the stress is cycling without resistive hydraulic forces. The shocks imparted by cyclic conditions are transferred throughout the entire string and by assuring uniform unitary connections the current configuration greatly reduces the deformation and displacement effects of such impacts. Moreover, the initially microscopic displacements between engaging parts which begin during cycling, and then tend to grow, are inhibited because the four parts of this design form a unitary columnar structure at each interconnection.

Figure 10:
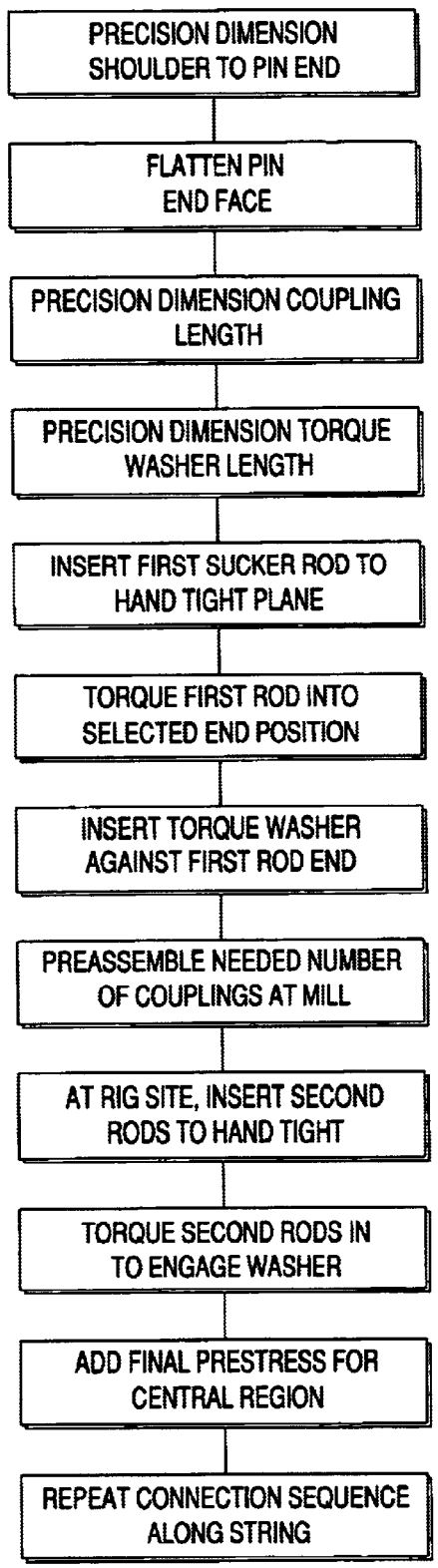
FIG. 10 is a block diagram showing the steps of methods in accordance with the invention.

The steps of methods in accordance with the invention are depicted in generalized form in FIG. 10. A preexisting inventory of API sucker rod can be modified so that a precise spacing exists between the end face and the radial wall of the pin end shoulder, for which purpose the chamfered end is machined off to a selected depth, which is typically only in the range of 0.001" to 0.035" and leaves adequate chamfer. Machining also is used to insure that the end face of the pin end is precisely flat and precisely transverse to the longitudinal axis, so that it can bear the axial loads and provide uniform load bearing areas. Concurrently also, the axial length of the coupling is machined to a precise dimension, all these dimensions being with an accuracy of ±0.0005".

With this pre-preparation, the mill facility makeup of sucker rods in coupling can undertaken, accompanied thereafter by firm engagement of an interior torque washer against the pin end faces. At the production or production workover site, the crew need not make any measurements or calculations, but can simply torque in the second pin end to add in the sucker rod to the string, stopping upon engagement with the torque washer, and adding the further desired increment of torque prestress for torque washer compression and coextensive stressing of the adjacent central portion of the coupling.

Extensive testing of sucker rod pin ends meeting API specifications has been conducted, based upon inspecting the degree of engagement of threads at different depths of penetration. To do this machine die is coated on the threads and the effects are observed after engagement under different conditions of pin end fabrication and field use. These tests have revealed that hitherto inappropriate variations in thread profile occur because tapping dies wear with usage and consequently change the thread profile, even within API specifications. Moreover, there are operative differences between engaged elements depending upon the number of prior uses of the couplings and pin ends. These factors become significant in the overall life of a sucker rod string, since the many thousands of cycles of reciprocation with a horsehead-type pumping system introduce initially microscopic displacements between elements and variations in the microstructure which become enlarged and enhanced with time and result in the ultimate fatigue failure of something in the string. The use of tensionally controlled and areally distributed forces in accordance with the invention contributes to the unitary structural nature of the interconnections and the significant enhancement of fatigue life.

Although some specific figures have been given for practical examples, it will be appreciated that the same principles may be utilized in applications requiring both larger and smaller forces. A number of other variations may be made in the systems, as in the configuration of the wrench heads, and in the hydraulic systems. The invention should be considered to include all variants and modifications within the scope of the appended claims.

What is claimed is:

1. In a sucker rod combination with a coupler interconnecting a pair of oppositely directed pin ends, wherein the sucker rods each include a male threaded end region with a terminal end face, a spaced apart radial shoulder having a flat engagement surface adjacent a different cross-section pin neck intervening between the radial shoulder and the adjacent side of the male thread, and the coupling having an interior female thread matingly receiving the male threads and end surfaces for contacting the engagement surfaces of the radial shoulders on inserted pin ends, wherein the combination comprises:

the pin ends having prepared end face to engagement surface dimensions preselected in relation to coupler length dimensions such that oppositely inserted pin ends in the coupling stretch the pin necks to selected tension levels when threaded to a predetermined depth past hand tight engagement of the engagement faces against the associated coupler ends, to compel engagement and lockup of the male and female threads, and concurrently placing the end faces of the pin ends in compressive prestress to force the central region of the coupler in tension to form a unified structure resistant to multiple loading cycles during sucker rod operation.

2. A fatigue resistant connection for oil field sucker rods to be coupled together in a string, the sucker rods having pin ends terminating in an end face and having an adjacent male threaded length, the end face being separated from an exterior radial shoulder on the sucker rod by a predetermined first distance which includes a pin neck of different diameter than the sucker rod diameter, and the connection comprising:

a hollow tubular sleeve having an interior female thread mating with the threaded lengths of the pin ends, the sleeve having a second predetermined overall length relative to the first predetermined first distance;

the pin ends of oppositely inserted sucker rods in the sleeve being threaded into a penetration distance of the end faces within the sleeve greater by a chosen axial distance than the penetration of the end face at the point of engagement of the radial shoulder thereon with the sleeve end and the first and second predetermined lengths being such that at said penetration distance, both pin ends are in compressive engagement and the pin necks are prestressed in tension substantially equally.

3. A connection as set forth in claim 2 above, wherein the connection further includes a selected compressive prestress between the pin ends at the selected penetration distance, and wherein the first predetermined distance is established by removal of material axially from the end face of the pin end.

4. A connection as set forth in claim 3 above, wherein the connection includes a threaded torque washer of selected length between the end faces of the pin ends and the first and second predetermined lengths are selected to account for the presence of the intervening torque washer.

5. A connection as set forth in claim 3 above, wherein the end faces of the pin ends are in direct engagement and the predetermined lengths and spacings are selected to provide the desired pin neck tension and central region compression.

6. A connection for sucker rods used in strings in petroleum wells comprising:

a pair of sucker rods each having a pin end with a shoulder 90 degrees to the longitudinal axis of the sucker rod, each pin end having an undercut stress relief pin neck area extending a predetermined axial length along the sucker rod, and at least an adjacent male threaded section with a flat transverse end face parallel to the pin end shoulder at a predetermined first dimension from the pin end shoulder;

a coupler having an interior female threaded section receiving the threaded male sections of pin ends oppositely inserted therein, wherein the shoulders on the pin ends of the sucker rods act as coupler end engagement members, and the coupler is dimensioned in length relative to the first dimension to provide calculated pin neck tension preload stresses in both sucker rods when the transverse end faces of the pin ends are in compressive engagement to a selected amount.

7. A connection as set forth in claim 6 above, wherein each pin end has a preselected axial penetration in the coupler to a chosen displacement of the pin end beyond hand tight engagement at pin shoulder to the adjacent coupler end, and wherein the pin neck tensions in the two pin ends are substantially equal.

8. A connection as set forth in claim 7 above, wherein the connection includes a further makeup stress in the central region of the coupler after the preselected axial penetration of the pin end, increasing compression between the pin ends in the mid-region of the coupler.

9. A connection as set forth in claim 8 above, wherein the calculated pin shoulder to coupler end face contact pressure, calculated pin neck under cut area tension prestress, calculated compressional loading of pin end faces compressive prestress in the mid-region of the coupler, act to lock the mating threads and limit fatigue failures of the coupler under repeated cyclic loading.

10. A connection as set forth in claim 9 above, further including a threaded torque washer positioned in the coupler between the end faces of the pin ends and the first dimensions of the pin ends and the length dimensions of the coupler are selected to allow for the presence of the torque washer.

* * * * *